United States Patent [19]

Meier et al.

[11] Patent Number: 4,797,296

[45] Date of Patent: Jan. 10, 1989

[54] PISTON-CYCLINDER-ASSEMBLY FOR A COFFEE BREWING APPARATUS AND A METHOD OF ITS OPERATION

[75] Inventors: Hermann Meier, Musenweg; Jean-Paul Franzolin, Au Floreal, both of Switzerland

[73] Assignee: Cafina AG, Hunzenschwil, Switzerland

[21] Appl. No.: 17,365

[22] Filed: Feb. 24, 1987

[30] Foreign Application Priority Data

Mar. 8, 1986 [DE] Fed. Rep. of Germany ....... 3607656

[51] Int. Cl.⁴ .............................................. A23F 5/00
[52] U.S. Cl. ................... 426/433; 99/289 R; 99/302 P; 426/231
[58] Field of Search ............ 99/279, 287, 289 R, 99/289 T, 289 D, 289 P, 297, 302 P, 302 R, 285, 300; 426/433, 231

[56] References Cited

U.S. PATENT DOCUMENTS

| | | | |
|---|---|---|---|
| 3,349,690 | 10/1967 | Heier | 99/289 |
| 3,565,641 | 2/1971 | King | 99/287 |
| 3,660,117 | 5/1972 | Neely | 99/289 |
| 4,457,216 | 7/1984 | Dremmel | 99/287 |

FOREIGN PATENT DOCUMENTS

2053466 5/1971 Fed. Rep. of Germany .
WO820120 5/1982 PCT Int'l Appl. .

Primary Examiner—Robert W. Jenkins
Attorney, Agent, or Firm—Tarolli, Sundheim & Covell

[57] ABSTRACT

The invention provides a piston-cyclinder-assembly for a coffee brewing apparatus, the assembly comprising a cylindric cavity serving as a brewing chamber, a closing member mounted on the cylindric cavity at one end thereof, and a piston which can be displaced into and retracted from the brewing chamber at the other end. The piston is equipped with internal brewing water channels leading to the front face of the piston and connected to a brewing water connector. The closing member has plate-like shape and is fixed against movement in axial direction of the brewing chamber but is pivotally mounted near the cylindric cavity. To drive the piston into the cavity and to retract it, and to pivot the closing member, first and second stepping motors, respectively, are provided which are operatively connected to a control unit. Another embodiment is provided with a normal electric motor to drive the piston and with a pressure sensor. As soon as the piston exerts a preselected pressure on the coffee powder in the brewing chamber, the displacement of the piston is stopped.

14 Claims, 5 Drawing Sheets

FIG. 6
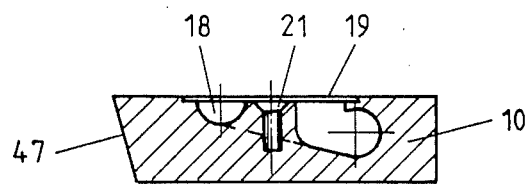
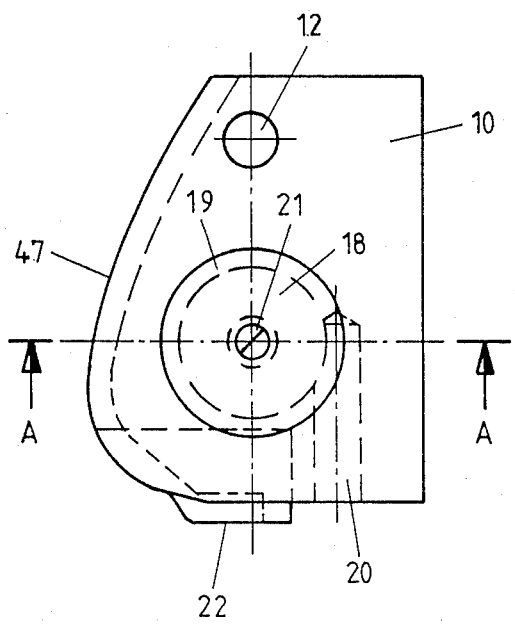
FIG. 5

PISTON-CYCLINDER-ASSEMBLY FOR A COFFEE BREWING APPARATUS AND A METHOD OF ITS OPERATION

BACKGROUND OF THE INVENTION

1. Field of the Invention

The present invention relates to coffee brewing apparatuses and particularly to a piston-cylinder-assembly to be used in a coffee brewing apparatus. Even more particularly, the invention relates to a piston-cylinder-assembly comprising a cylindric cavity serving as a brewing chamber, a closing member mounted on the brewing chamber at one end thereof and a piston adapted to be displaced into and retracted from the interior of the brewing chamber at the other end of the brewing chamber, said piston including a brewing water connector member and internal channels leading from the brewing water connector member to the front face of the piston. Forthermore, the invention relates to a method of operating the above mentioned piston-cylinder-assembly.

2. Prior Art

Coffee brewing apparatuses incorporating a similar piston-cylinder-assembly are known in the art, e.g. from the Patent Publication PCT-WO No. 82/01120 and the German Laid Open Publication No. 20 53 466.

The apparatus disclosed in the publication PCT-WO No. 82/01120 comprises a cylinder and two pistons which are displaceable independently from each other and in opposite directions. The coffee powder to be scalded is contained between the two pistons. In operation, the coffee powder is filled into the space between the two pistons and steeped with hot water when it is still loose to allow it to swell. Thereafter, one of the two pistons is further displaced to compact the coffee powder and hot water is forced through the compacted coffee powder to prepare the beverage. In this way, two objects should be met. On one hand, an aromatic strong coffee should be obtained with a small quantity of coffee powder; on the other hand, the quantity of coffee powder should be dosed thanks to the two pistons which are displaceable independently from each other in order to select the intensity of the taste of the coffee.

However, this publication does not disclose how to adjust or dose the amount of coffee powder by means of the two independently movable pistons. Moreover, the disclosure of this publication is limited to the teaching that two independently movable pistons are provided to close the brewing chamber, that the still loose coffee powder is scalded in a first phase and that the coffee powder is subsequently compacted to prepare the desired beverage.

It is possible that an improved exploitation of the coffee powder may be achieved, but the apparatus according to the aforementioned publication is disadvantageous insofar as its design is quite complicated due to the provision of two independently displaceable pistons and that the preparation cycle takes a comparatively long time so that one has to wait unduly long until a cup of coffee is prepared.

Also the structure of the coffee brewing apparatus according to the German Laid Open Publication No. 20 63 466 comprises two pistons. While the upper piston may be retracted out of the brewing chamber in order to enable the brewing chamber to be filled with coffee powder to be scalded and serves to close the brewing chamber as well as to compact the coffee powder contained therein, the lower piston serves as closing element of the brewing chamber and its position may be changed by a number of preset stops, obviously mainly to vary the internal volume of the brewing chamber, but also to alter the compacting pressure exerted on the coffee powder by the first displaceable piston.

The constructional expenditure of this structure is quite high as well and the desired object is not fully met since the compacting pressure and the internal volume of the brewing chamber can be altered but very roughly.

OBJECTS OF THE INVENTION

It is a general object of the invention to provide a piston-cylinder-assembly for a coffee brewing apparatus which avoids the aforementioned drawbacks and which is of simple and rugged construction.

It is a further object of the invention to provide a piston-cylinder-assembly which ensures always a constant high quality of the coffee brewing independently of fluctuations in coffee powder consistency, operational tolerances of the apparatus and increasing wear of the components thereof.

Particularly, it is an object of the invention to provide a piston-cylinder-assembly for use in a coffee brewing apparatus in which the internal volume of the brewing chamber being continuously adjustable by the piston and/or the pressure exerted by the piston on the coffee powder in the brewing chamber is freely selectable in order to enable the coffee brewing apparatus to prepare coffee beverages of various kinds and in preselected quantities.

SUMMARY OF THE INVENTION

According to a first aspect of the invention, these and other objects of the invention are met with a piston-cylinder-assembly of the kind described hereinabove, the improvement consisting in that the closing member is fixed against movement in axial direction of the cylindric cavity serving as the brewing chamber, and that an electric motor is provided to drive the piston as well as control means including pressure sensing means to determine the pressure exerted by the piston on the coffee powder filled into the brewing chamber and to stop the motor when a preselected pressure is reached.

According to a second aspect of the invention, the above and other objects of the invention are met with a piston-cylinder-assembly of the kind described hereinabove, the improvement consisting in that the closing member is fixed against movement in axial direction of the cylindric cavity serving as the brewing chamber, and that a stepping motor is provided to drive the piston as well as control means to stop the motor when it has performed a preselected number of steps.

According to a third aspect of the invention, the above and other objects of the invention are met with a piston-cylinder-assembly of the kind described hereinabove, the improvement consisting in that the closing member is fixed against movement in axial direction of the cylindric cavity serving as the brewing chamber, and that a stepping motor is provided to drive the piston as well as control means including pressure sensing means to determine the pressure exerted by the piston on the coffee powder filled into the brewing chamber and to stop the motor when a preselected pressure is reached.

In any of the above three cases, the brewing chamber is fixedly closed during the cofffee scalding step, while the piston displaceable from the other end into the interior of the brewing chamber may penetrate thereinto by an exactly predetermined amount under the influence of the control unit. Thus, not only the available or required internal volume of the brewing chamber can be selected depending of the amount of coffee powder which has been filled in, but also the pressure exerted on the coffee powder in the brewing chamber by driving the piston more or less into the brewing chamber, either by interrupting the displacement movement of the piston as soon as a preselected pressure is reached, or by interrupting the displacement movement of the piston as soon as a preselected number of steps is reached which has been calculated to be required to exert the desired pressure.

Preferred embodiments and further details will become apparent from reading the following specification and the appended claims.

According to a fourth aspect of the invention, the above and other objects are met with an improved method to operate a piston-cylinder-assembly as described hereinabove, the improvement comprising the step of relating the length of the path of displacement of the piston into the interior of the brewing chamber to the amount of coffee powder filled into the brewing chamber and to the kind of coffee beverage to be prepared.

Thus, the operating conditions in the brewing chamber are optimally adapted to the kind or brand of coffee powder filled into the brewing chamber, to the desired strength of the coffee beverage and to the amount of coffee beverage which has to be prepared. Simultaneously the coffee powder filled into the brewing chamber is efficiently exploited.

In order to support a gentle operation of the piston-cylinder-assembly, the piston may be retracted from its operative position by a small amount after scalding the coffee powder and prior to displacing the closing member from an operative position in which it closes the brewing chamber into its rest position in which the brewing chamber is open at the lower end.

To enable an essentially automatic operation of the coffee brewing apparatus incorporating a piston-cylinder-assembly according to the invention, the piston may be further displaced towards the second open end of the brewing chamber after displacing the closing means from the operative position to the rest position to eject the scalded coffee powder, whereby the ejected coffee powder cake is removed upon displacing the closing means from the rest position back to the operative position.

DESCRIPTION OF A PREFERRED EMBODIMENT

Below an embodiment of the piston-cylinder-assembly according to the present invention will be further described, with reference to the accompanying drawings. The specification hereinbelow relates specifically to the embodiment using a stepping motor to linearly displace the piston. However, all explanations and details given hereafter essentially also apply to an embodiment using a normal electric motor which is operated under the influence of a control unit incorporating a pressure sensor. In the drawings, FIG. 1 shows a partly sectioned schematic side view of a piston-cylinder-assembly according to the invention in a first phase of operation;

FIG. 5 shows a schematic top view of a closing member removed from the piston-cylinder-assembly; and FIG. 6 shows a sectional view of the closing member along the line A—A in FIG. 5.

Figure 1:
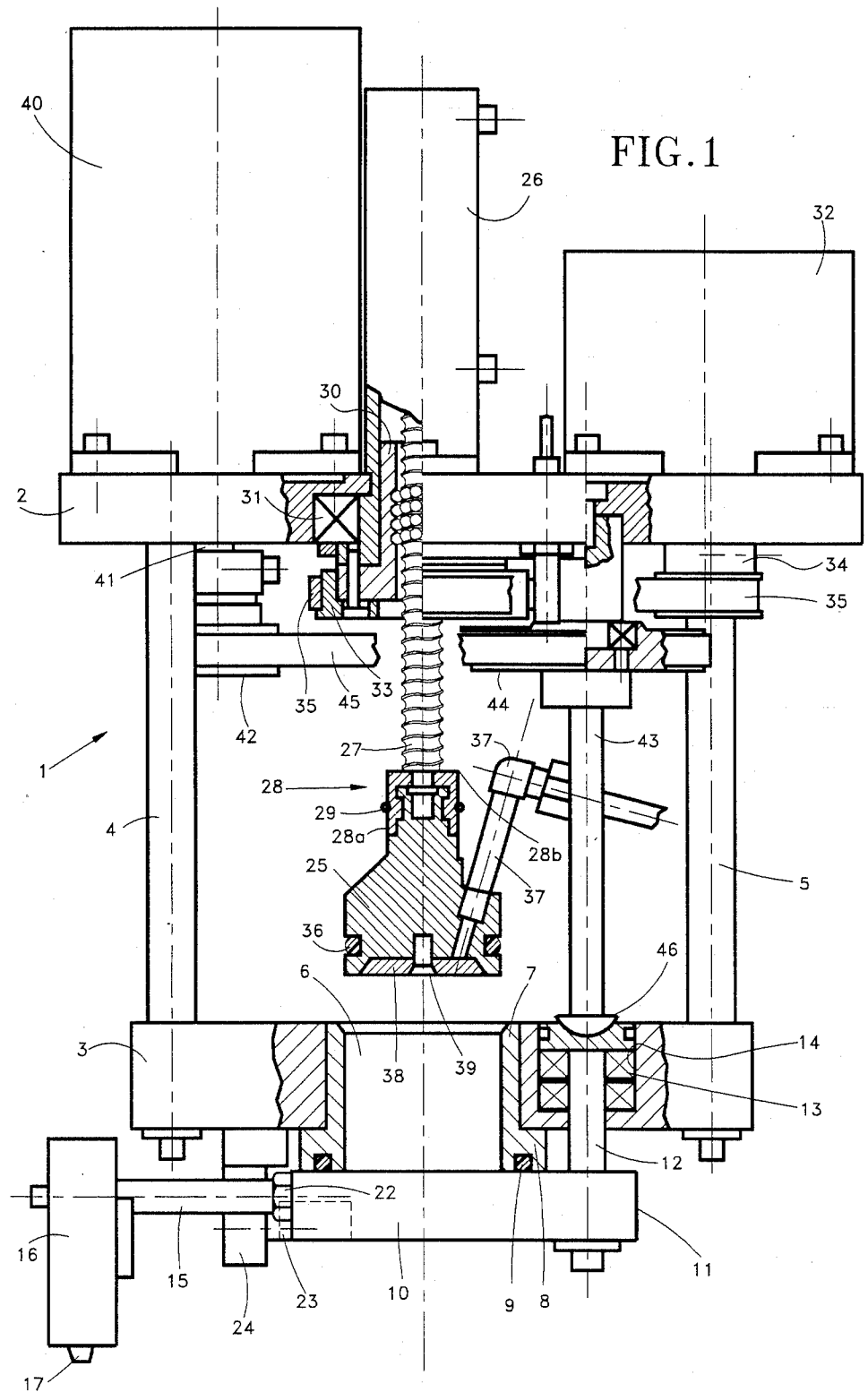

In FIGS. 1 to 4, an embodiment of the piston-cylinder-assembly according to the invention using a stepping motor to linearly displace the piston is schematically shown in four different, characteristic operation phases. The individual phases of operation will be further explained later; first, the design and construction of the piston-cylinder-assembly shall be described in detail.

The piston-cylinder-assembly 1 comprises a first upper base plate member 2 and a second lower base plate member 3 rigidly connected to each other by means of several connecting columns 4 and 5, only two thereof being shown in the drawings, in distant and parallel relationship. The second lower base plate member 3 includes a cylindric cavity which serves as the brewing chamber 6. In the present example, the brewing chamber 6 may be constituted by the interior of a hollow cylindric sleeve 7 inserted into the second lower base plate member 3 and manufactured e.g. of stainless steel. The upper end of the sleeve 7 flushes with the upper surface of the lower base plate member 3, and the lower end of the sleeve 7 comprises an annular flange 8 of increased diameter projecting from the lower surface of the second lower base plate member 3. The freely exposed front face of the flange 8 comprises an annular groove into which an annular sealing member 9, e.g. manufactured of rubber or plastic, is inserted.

Figure 2:
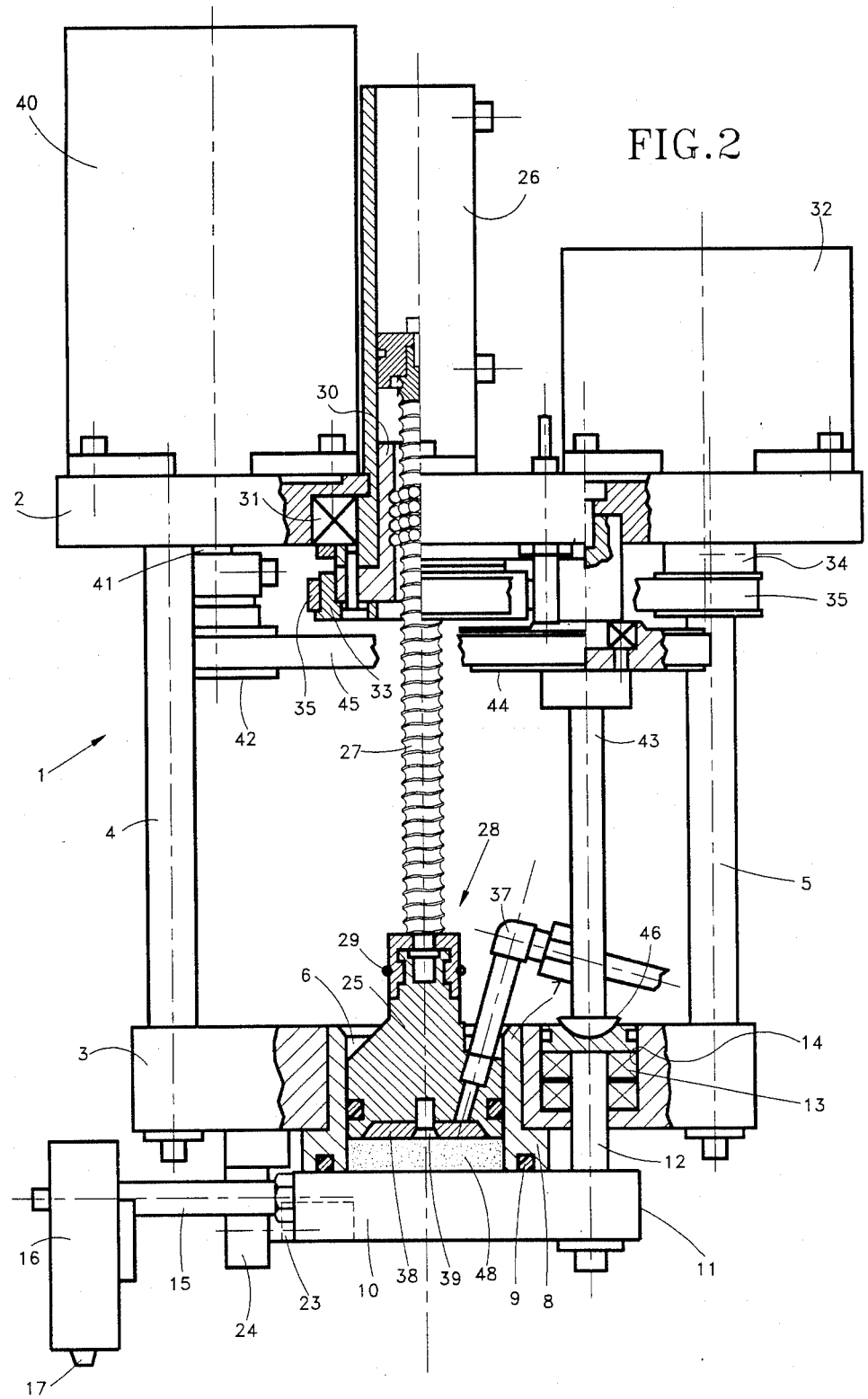
FIG. 2 shows a partly sectioned schematic side view of a piston-cylinder-assembly according to the invention in a second phase of operation.

Furthermore, the second lower base plate member 3 serves to support a closing member 10 of essentially plate-like shape comprising an eccentrically, i.e. closely to the edge 11 mounted shaft 12 which projects upwardly and the free end thereof being received in a bearing assembly 13. The bearing assembly 13 may include, for instance, two ball bearings which are inserted in a opening 14 in the second lower base plate member 3. The opening 14 is located outside of the sleeve 7 whereby the central axis of the opening 14 and thereby the rotation axis of the bearing assembly 13 extends parallel to the central axis of the sleeve 7. The distance between the closing member 10 and the second lower base plate member 3 is chosen such that the upper surface of the closing member 10 rests on the freely exposed frontal face of the flange 8 of the sleeve 7. If the closing member 10 is in its operative position as shown in FIGS. 1 and 2, the lower end of the brewing chamber 6 is closed and the brewing chamber 6 is sealed against any leakage by means of the annular sealing member 9.

A beverage outlet head 16 incorporating two beverage outlet openings 17 is mounted on the closing member 10 by means of a interconnecting pipe 15 flanged to the side of the closing element 10 opposite to the side to which the shaft 12 is connected. The outlet openings 27 are connected to a annular channel 18 at the top of the closing member 10 via internal channels (not shown), the annular channel 18 being in the shape of a groove and covered by a micro mesh member 19 (FIGS. 5 and 6). The passage between the pipe 15 and the annular channel 18 is realized by a channel 20 in the interior of the closing member 10, the channel 20 merging tangentially into the annular channel 18 and leads outwards. The micro mesh member 19 is easily releasably connected to the closing member 10, e.g. by means of a screw 21, in order to facilitate the cleaning thereof. Furthermore, it is understood that the center of the annular channel 18 coincides with the central axis of the brewing chamber 6 if the closing member is in its operative closed position according to FIGS. 1 and 2.

Furthermore, locking means are provided at the second lower base plate member 3 and at the closing member 10 which prevent the closing member 10, when it is in its closed position, from any displacement in the direction of the central axis of the brewing chamber 6. In the embodiment shown in the drawings, particularly in FIGS. 3, 4 and 5, the locking means include a locking web 22 radially projecting from the closing member 10 and located diametrally opposite to the shaft 12. The locking web 22 cooperates with a protrusion 23 provided on a web 24 which projects from the second lower base plate member 3 downward. Upon rotating the closing member 10 around the shaft 12 into the closing position, the lower side of the web 22 engages the upper side of the protrusion 23. Preferably, the lower side of the web 22 and/or the upper side of the protrusion 24 may be slightly inclined in order to provide a pressure force exerted by the closing member 10 towards the lower face of the sleeve 7 and thereby on the annular sealing member 9 when it is rotated along the last portion of its rotation path to reliably seal the brewing chamber 6.

The piston 25 is height-adjustably mounted on the first upper base plate member 2. For that purpose, the upper surface of the first upper base plate member 2 bears a guiding and bearing assembly 26 adapted to receive a ball spindle 27 which receives at its lower free end the piston 25. In the interior of this guiding and bearing assembly 26, the pressure sensor member 49 is mounted which measures the pressure exerted by the piston 25 on the coffee powder cake 48 if the piston 25 is in the position shown in FIG. 3.

The piston 25 is mounted on the free end of the spindle 27 by means of a releasable coupling member 28 including two essentially semicylindric coupling shells 28a and 28b. The latter ones engage annular webs and annular grooves, respectively, not further designated and provided at the end of the spindle 28 as well as at the top of the piston 25. For this purpose, the inner surfaces of the two shells 28a and 28b are provided with correspondingly shaped annular grooves and annular webs to establish a positive connection of the piston 25 to the spindle 28. To hold the two shells 28a and 28b together, an elastically resilient clamping member, e.g. a rubber ring 29 is provided.

The displacement of the spindle 27 and thereby of the piston 25 regarding their height is performed by means of a ball screw sleeve 30 rotatably but axially fixedly mounted, e.g. by means of a bearing 31, in the first upper base plate member 2. The design and construction of such a ball screw drive gear is well known in the art and need not to be further explained here. However, it is essential and must be pointed out that rotation of the ball screw sleeve 30 results in an essentially friction- and clearance-free displacement of the spindle 27 along the direction of its central axis.

The ball screw sleeve 30 is driven by a stepping motor 32 mounted on the first upper base plate member 2 as well. For this purpose, the ball screw sleeve 30 is provided with a pulley 33 fixedly mounted on the sleeve 30 for rotation therewith and projecting over the lower surface of the first, upper base plate member, and the stepping motor 32 if provided with a pulley 34 projecting over the lower surface of the first upper base plate member 2 as well. The two pulleys 33 and 34 are coupled by means of a toothed belt 35 which ensures a transmission of the torque delivered by the stepping motor 32 to the ball screw sleeve 30 essentially without clearance and slip.

The position of the bearing assembly 26 for the piston 25 is such that the central longitudinal axis of the piston 25 coincides with the central longitudinal axis of the brewing chamber 6. Starting from the upper rest position of the piston 25 shown in FIG. 2, an operation of the stepping motor 32, the correct sense of rotation supposed, will cause that the piston 25 is lowered towards the brewing chamber 6 and finally enters the interior thereof. The outer diameter of the piston 25 corresponds essentially to the inner diameter of the sleeve 7 constituting the brewing chamber 6, a slight clearance being provided, of course, whereby an annular sealing member 36 mounted in a circumferential groove of the piston 25 serves to seal the interior of the brewing chamber 6 once the piston 25 has entered the chamber 6.

Furthermore, the piston 25 is provided with a brewing water connector member 37 which is connected to a hot water supply (not shown). The brewing water connector member 37 merges in a dispensing member 38 mounted in the interior of the piston 25 which provides for a delivery of the brewing water equally distributed around the front face of the piston 25. Preferably, the dispensing member 38 is easily releasably connected to the piston 25, e.g. by means of a screw 39, in order to facilitate cleaning thereof.

To pivot the closing member 10, a further stepping motor 40 is provided, mounted on the first upper base plate member 2 as well. The drive shaft 41 of the stepping motor 40 projects downwardly through an opening in the base plate member 2 and has a pulley 42 mounted on its end. A drive shaft 43 is rotatably mounted on the first upper base plate member 2 and extends coaxially to the shaft 12 of the closing member 10. The drive shaft 43 is equipped with a pulley 44, and the pulleys 42 and 44 are coupled by means of a toothed belt 45. The lower end of the drive shaft 43 is connected to the rotatably mounted shaft 12 of the closing element 10 by means of a coupling member 46 in order to enable the closing member 10 to be pivoted by the operation of the stepping motor 40.

The two stepping motors 32 and 40 are connected to a control unit (not shown) of known design and construction. Preferably, the control unit does not only control the operation of the two stepping motors 32 and 40, but also further operations within the coffee preparation cycles, e.g. it effects control of the preparation of the brewing water, control of the temperature thereof, control of a pump to feed the brewing water into the brewing chamber, control of a coffee milling means to prepare the required coffee powder, control of the supply of coffee powder into the brewing chamber etc. The design and construction of such a control unit is not an object of the invention since it is well known in the art; obviously, any skilled person will be in a position to choose a suitable control unit and to program it in accordance with preselected requirements so that the control unit needs not to be explained in more detail here.

As can be seen in FIGS. 5 and 6, the closing member 10 has a chamfered edge 47 directed towards the lower opening of the brewing chamber 6 when the closing member 10 is in its pivoted open or rest position. As will be further explained hereinafter, the chamfered edge 47 serves to scrape the scalded coffee powder cake 48a (FIG. 4) ejected by the piston 25 during the pivotal movement of the closing member 10 from its rest position to its operative position.

The operation of the piston-cylinder-assembly within a coffee brewing apparatus and shown as a preferred embodiment in the enclosed drawings is as follows:

PHASE 1

According to FIG. 1, the piston-cylinder-assembly 1 is in its initial rest position at the beginning of a coffee preparation cycle. The brewing chamber 6 is empty, the closing member is in its operative position closing the lower end of the brewing chamber 6, and the piston 25 is in its upper rest position. Now, a not shown but well known dosing and feeding unit is operated to feed coffee powder into the brewing chamber 6. The amount of coffee powder to be filled into the brewing chamber 6 depends of the quality of the desired coffee beverage (normal coffee, strong Italian coffee etc.) and the desired quantity thereof (one/two small cups, one/two large cups). As already mentioned hereinabove, a control unit is provided to control th dosing and feeding unit to cause the desired result. Subsequently, the piston 25 is lowered and enters the brewing chamber 6.

PHASE 2

According to FIG. 2, the piston 25 has been lowered into the brewing chamber 6 and compacts the coffee powder exerting thereby a preselected pressure on the coffee powder 48 contained in the brewing chamber 6. The displacement path of the piston 25 is controlled by the (not shown) control unit depending of the program which previously had been selected; in the present example, the control unit causes the stepping motor 32 to perform a preselected number of steps. Due to the linear operating characteristics of the ball screw gear one step of the stepping motor 32 corresponds exactly to a well defined path increment of the piston 25. The coffee powder 48 being compacted, a (not shown) hot water supply assembly including a feeding pump supplies brewing water through the connector member 37 into the interior of the piston 25 and to the dispensing member 38. Therefrom, the brewing water penetrates the coffee powder 48 contained in the brewing chamber 6, and the beverage prepared in this way flows through the micro mesh 19, the annular channel 18, the tangential channel 20 and the pipe 15 into the beverage outlet head 16 to leave it through the outlet openings 17. Of course, one or two cups have been placed below the outlet openings 17 prior to starting the apparatus to collect the prepared beverage. The closing member is prevented from any movement in axial direction by the locking means 22 and 23.

The Table 1 hereinbelow shows the parameters of an exemplary six step coffee preparation program:

TABLE 1

|  | 1 Esp. | 2 Esp. | 1 CC | 2 CC | 1 CM | 2 CM |
| --- | --- | --- | --- | --- | --- | --- |
| Coffee powder (grams) | 9 | 16 | 8 | 14 | 7 | 12 |
| Number of steps | 1556 | 1400 | 1578 | 1444 | 1600 | 1488 |
| Exerted pressure (kp) | 80 | 50 | 60 | 30 | 50 | 25 |
| Hot water (cm$^3$) | 70 | 140 | 150 | 300 | 120 | 240 |
| Passing time (sec.) | 15 | 25 | 20 | 30 | 15 | 25 |

In the above Table 1, the meaning of the abbreviations is as follows:

1 Esp.: 1 cup of Espresso (strong Italian coffee)
2 Esp.: 2 cups of Espresso
1 CC: 1 cup of coffee with cream
2 CC: 2 cups of coffee with cream
1 CM: 1 cup of coffee with milk
2 CM: 2 cups of coffee with milk
Number of steps: The number of steps the stepping motor 32 performs in one cycle, starting from the upper rest position of the piston.

As can be seen from the above Table 1, a specific group of reference parameters is related to each kind and amount of beverage. These parameters initially entered into the control unit and stored therein enable the coffee brewing apparatus to prepare a tasty coffee beverage and to optimally exploit the coffee powder. Using a stepping motor to displace the piston 25 into the brewing chamber 6 ensures that the required pressure is exerted on the coffee powder 48 in the brewing chamber 6 easily and accurately.

PHASE 3

Figure 3:
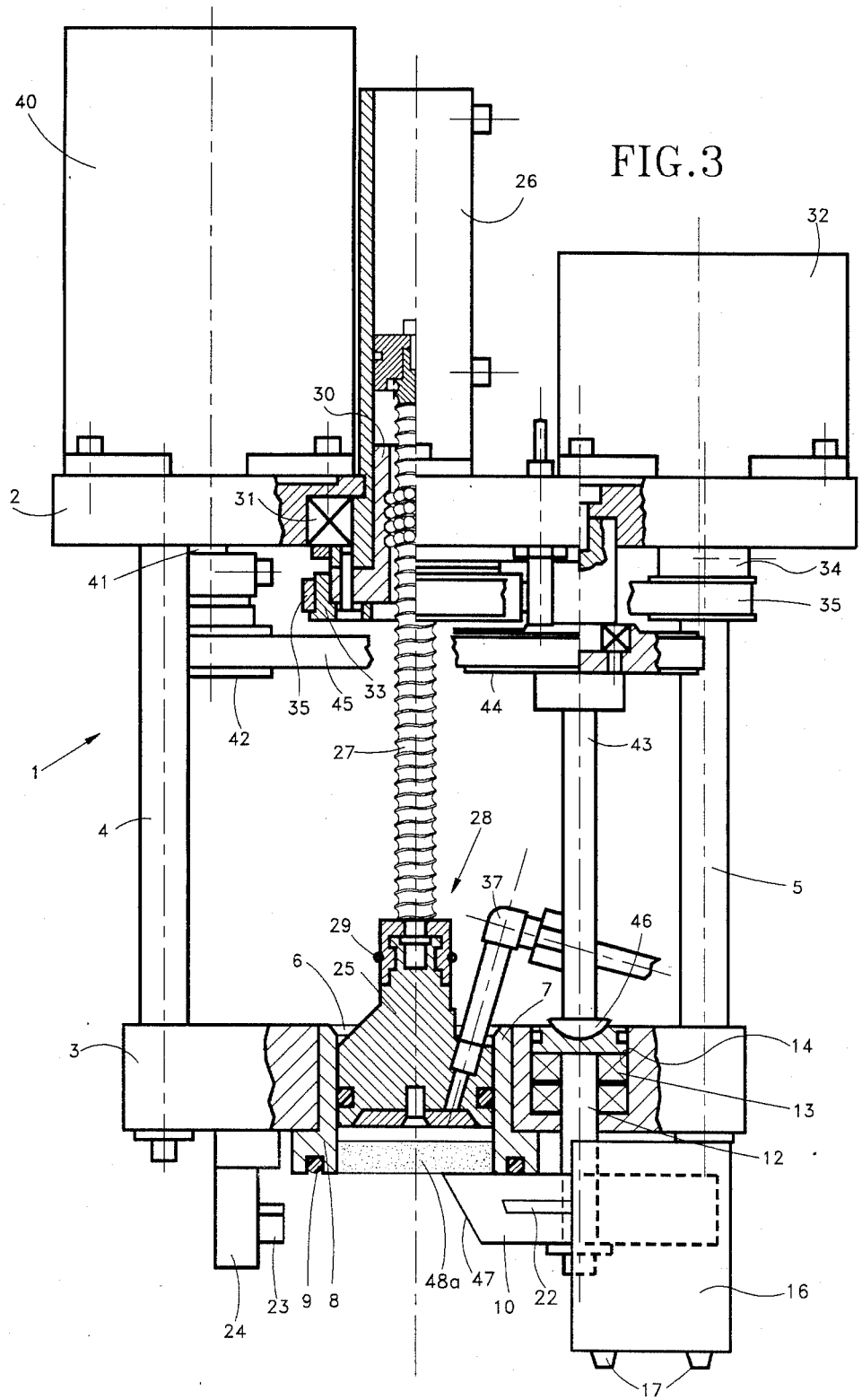
FIG. 3 shows a partly sectioned schematic side view of a piston-cylinder-assembly according to the invention in a third phase of operation.

The coffee beverage having left the head 16 through the openings 17, the piston 25 is retracted a small amount by operating the stepping motor 32 in a reverse sense in order to release any pressure exerted on the coffee powder cake 48a and the closing member 10 (FIG. 3). Thereafter, the stepping motor 40 is operated, under the influence of the control unit mentioned above and not shown in the drawings, in order to pivot the closing member 10 to its rest position. The lower opening of the brewing chamber 6 is now open. This situation is shown in FIG. 3. In most cases, the coffee powder cake 48a will stick on the walls of the brewing chamber 6 due to the pressure which had been exerted on it during the coffee scalding phase and, consequently, will not readily fall out of the brewing chamber.

PHASE 4

Figure 4:
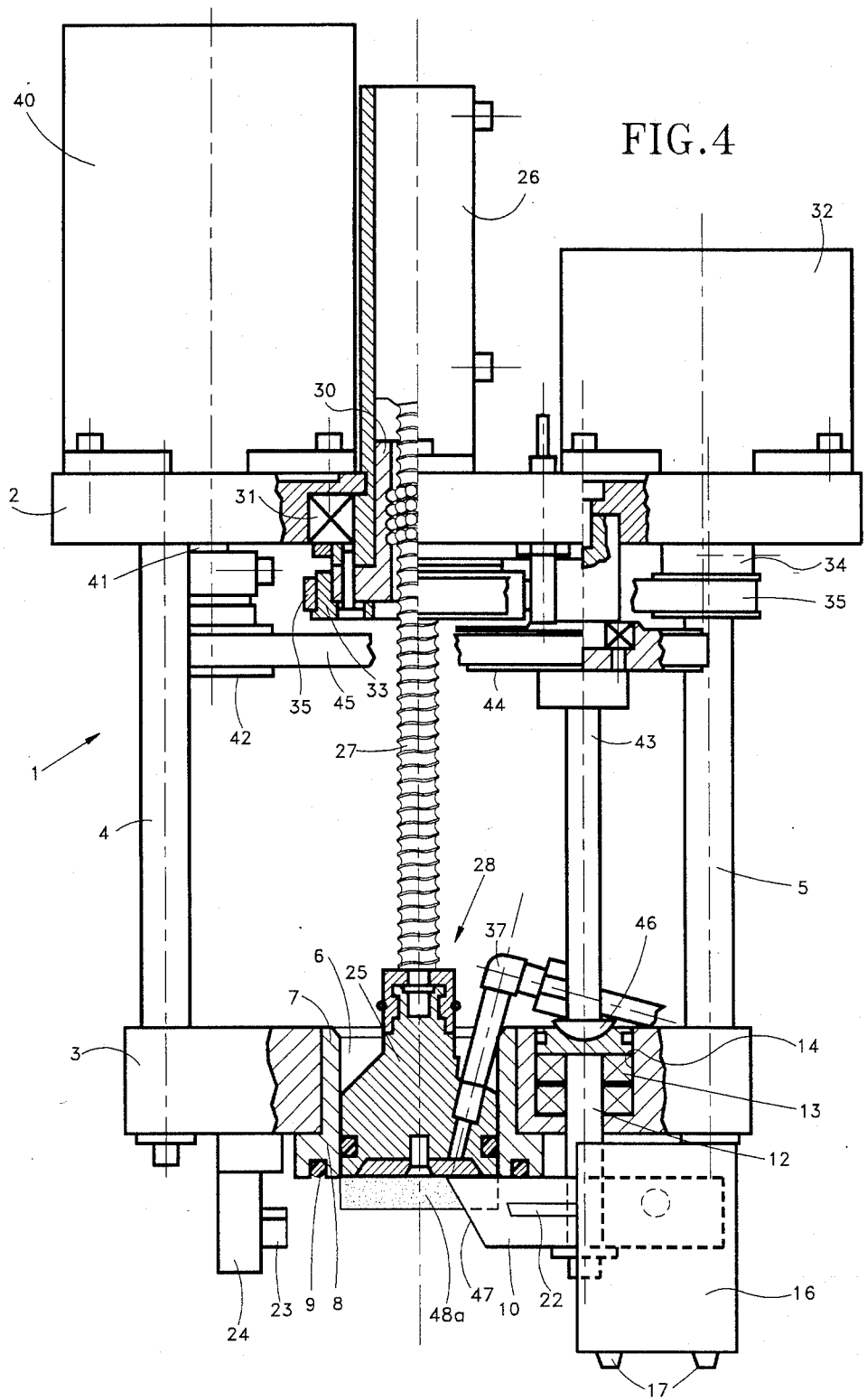
FIG. 4 shows a partly sectioned schematic side view of a piston-cylinder-assembly according to the invention in a fourth phase of operation.

According to FIG. 4, the piston 25 is further lowered into the interior of the brewing chamber 6 by operating the stepping motor 32 whereby the closing member is still in its open rest position. Thereby the coffee powder cake 48a is removed from the brewing chamber 6. Since it is most probable that the coffee powder cake 48a will stick on the lower surface of the piston 25, it will not fall down into a (not shown) receptacle located below the brewing chamber 6. Now the closing member 10 is pivoted back to its operative position by operating the stepping motor 40 whereby the coffee powder cake 48a sticking on the lower surface of the piston 25 is scraped off by the leading chamfered edge 47 of the closing member 10 and falls into the aforementioned (not shown) receptacle. Simultaneously or immediately thereafter, the piston 25 is retracted in its upper rest position by operating the stepping motor 32; now, the situation shown in FIG. 1 is reached again and the entire coffee brewing cycle may start again, if desired.

For sake of simplicity and for better understanding, the four operating phases have been explained, as one would believe, in a logical sequence. In practice, however, it is recommended to keep the brewing chamber 6 closed after the coffee powder has been scalded until the next cup of coffee is to be prepared. This means that the preparation cycle according to the four phases explained hereinbefore is stopped after phase 2; only when another cup of beverage is to be prepared, the phases 3 and 4 and thereafter the phases 1 and 2 are run. Thus, it is achieved that coffee powder traces probably remaining in the brewing chamber 6 cannot oxidize and thereby impair the taste of the beverage subsequently prepared because the coffee powder is kept in the brewing chamber essentially isolated from the atmosphere until the next beverage is to be prepared.

As already mentioned, the use of a stepping motor to drive the piston 25 ensures an extremely fine and exactly presettable positioning of the piston in the brewing chamber. Thereby, optimal conditions for the brewing of any desired amount of coffee powder filled into the brewing chamber are created. Since it is useful or even required to provide a control unit to operate an automatic coffee brewing apparatus, the use of stepping motors to displace the piston and to pivot the closing member result in a significant constructional simplification because such stepping motors, as is well known, may be controlled very easily and with reproducible accuracy to any desired extent. The result is that the pressure exerted by the piston on the coffee powder contained in the brewing chamber may be precisely adjusted to the desired value, depending of the quality and quantity of the beverage to be prepared, and further, that the pivotal movement of the closing member from one position to the other one is caused quickly and precisely without the need to provide stop means, safety clutches or similar means.

Correspondingly, the same is true if a conventional electric motor is used instead of the stepping motor 32. In order to meet the objects of the invention, a pressure sensor is provided which is comprised e.g. in the spindle 27 and measures the pressure exerted by the piston 25 on the coffee powder 48 in the brewing chamber 6.

Instead of operating the stepping motor to perform a preselected number of steps to displace the piston into the brewing chamber, as in the example hereinbefore described, the piston is displaced towards the coffee powder by the electric motor and the back pressure is continuously measured. A certain preset coffee quality requires a specific known pressure to be exerted to the coffee powder. As soon as this specific pressure is reached, the further displacement of the piston towards the coffee powder is stopped by interrupting the operation of the electric motor. This embodiment is especially useful if the amount of the coffee powder filled into the brewing chamber fluctuates or is inaccurate; such fluctuations may be caused by using different brands and/or qualities of coffee beans or coffee powder.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What we claim is:

1. A piston-cylinder-assembly for use in a coffee brewing apparatus, comprising:
   spaced first and second frame members;
   a cylindric cavity formed in the second frame member, said cylindric cavity serving as a brewing chamber into which coffee powder to be scalded is filled, and having a first open end facing the first frame member and a second open end remote from said first frame member;
   a piston member mounted on said first frame member coaxially with said cylindric cavity and displaceable axially toward and away from said cylindric cavity, said piston member comprising internal brewing water channels merging to the outside in the region of its front surface adjacent to said first open end of said cylindric cavity, and connected to a brewing water supply pipe;
   first drive means mounted on said first frame member and operatively coupled to said piston member for displacing said piston member between a rest position in which the front surface of said piston member is spaced from said first open end of said cylindric cavity to permit access to said first open end, and an operative position in which the piston member closes said first open end of said cylindric cavity;
   closing means mounted on said second frame member and displaceable between an operative position in which said closing means closes said second open end of said cylindric cavity, and a rest position in which said closing member does not hinder access to said second open end of said cylindric cavity, said closing means being fixed with respect to the central axis of said cylindric cavity;
   second drive means operatively coupled to said closing means for displacing said closing means between said operative and rest positions;
   said first drive means comprising an electric motor, gear means driven by said electric motor, and control means comprising a pressure sensor for sensing the pressure exerted by the front face of said piston member on the coffee powder in said cylindrical cavity and for generating a stop signal to stop the operation of said electric motor when a preselected pressure is reached.

2. A piston-cylinder-assembly for use in a coffee brewing apparatus, comprising:
   spaced first and second frame members;
   a cylindric cavity formed in the second frame member, said cylindric cavity serving as a brewing chamber into which coffee powder to be scalded is filled, and having a first open end facing the first frame member and a second open end remote from said first frame member;
   a piston member mounted on said first frame member coaxially with said cylindric cavity and displaceable axially toward and away from said cylindric cavity, said piston member comprising internal brewing water channels merging to the outside in the region of its front surface adjacent to said first open end of said cylindric cavity, and connected to a brewing water supply pipe;

first drive means mounted on said first frame member and operatively coupled to said piston member for displacing said piston member between a rest position in which the front surface of said piston member is spaced from said first open end of said cylindric cavity to permit access to said first open end, and an operative position in which the piston member closes said first open end of said cylindric cavity;

closing means mounted on said second frame member and displaceable between an operative position in which said closing means closes said second open end of said cylindric cavity, and a rest position in which said closing member does not hinder access to said second open end of said cylindric cavity, said closing means being fixed with respect to the central axis of said cylindric cavity;

second drive means operatively coupled to said closing means for displacing said closing means between said operative and rest positions;

said first drive means comprising a stepping motor, gear means driven by said stepping motor, and control means comprising counting means for determining the number of steps performed by said stepping motor when it displaces said piston member from said rest position to said operative position and for generating a signal to stop operation of said stepping motor when a preselected number of steps is reached.

3. A piston-cylinder-assembly for use in a coffee brewing apparatus, comprising:

spaced first and second frame members;

a cylindric cavity formed in the second frame member, said cylindric cavity serving as a brewing chamber into which coffee powder to be scalded is filled, and having a first open end facing the first frame member and a second open end remote from said first frame member;

a piston member mounted on said first frame member coaxially with said cylindric cavity and displaceable axially toward and away from said cylindric cavity, said piston member comprising internal brewing water channels merging to the outside in the region of its front surface adjacent to said first open end of said cylindric cavity, and connected to a brewing water supply pipe;

first drive means mounted on said first frame member and operatively coupled to said piston member for displacing said piston member between a rest position in which the front surface of said piston member is spaced from said first open end of said cylindric cavity to permit access to said first open end, and an operative position in which the piston member closes said first open end of said cylindric cavity;

closing means mounted on said second frame member and displaceable between an operative position in which said closing means closes said second open end of said cylindric cavity, and a rest position in which said closing member does not hinder access to said second open end of said cylindric cavity, said closing means being fixed with respect to the central axis of said cylindric cavity;

second drive means operatively coupled to said closing means for displacing said closing means between said operative and rest positions;

said first drive means comprising a stepping motor, gear means driven by said stepping motor, and control means comprising a pressure sensor for sensing the pressure exerted by the front face of said piston member on the coffee powder in said cylindric cavity and for generating a stop signal to stop the operation of said stepping motor when a preselected pressure is reached.

4. A piston-cylinder-assembly according to claim 1, 2 or 3, in which said gear means includes a ball screw drive assembly comprising a rotatable ball screw sleeve and a ball screw spindle received in said ball screw sleeve movable axially upon rotation of said ball screw sleeve.

5. A piston-cylinder-assembly according to claim 4 further comprising a releasable coupling member for releasably connecting said piston member to the end of said ball screw spindle.

6. A piston-cylinder-assembly according to claim 5, in which said releasable coupling member comprises two essentially semi-cylindric coupling shells positively engaging an end portion of said piston member and an adjacent end portion of said ball screw spindle, and a resilient annular member for holding said coupling shells together.

7. A piston-cylinder-assembly according to claim 1, 2, or 3, in which said closing means comprises a plate-shaped closing member eccentrically mounted to perform a pivotal movement around an axis which extends outside of said cylindric cavity parallel to the central longitudinal axis of said cylindric cavity.

8. A piston-cylinder-assembly according to claim 7, in which said second drive means comprises a stepping motor for pivoting said plate-shaped closing member between an operative position in which said closing member closes said second open end of said cylindric cavity, and a rest position in which said closing member does not hinder access to said second open end of said cylindric cavity.

9. A piston-cylinder-assembly according to claim 7, in which said plate-shaped closing member comprises locking means for preventing the closing member from displacement in a direction of the central longitudinal axis of said cylindric cavity when the closing member is in said operating position.

10. An assembly for use in a coffee brewing apparatus, comprising:

means defining a brewing chamber into which coffee powder to be scalded is filled, said brewing chamber having first and second open ends;

a piston member displaceable axially toward and away from said brewing chamber;

first drive means coupled to said piston member for displacing said piston member between a rest position in which said piston member is spaced from said first open end of said brewing chamber and an operative position in which the piston member closes said first open end of said brewing chamber and reduces the internal volume of said brewing chamber containing the coffee powder to exert a preselected pressure on the coffee powder;

control means for sensing the pressure exerted by said piston member on the coffee powder in said brewing chamber and for generating a stop signal to stop the operation of said first drive means when the preselected pressure is reached;

means for directing hot water into said brewing chamber; and outlet means communicating with said brewing chamber and through which prepared coffee beverage is dispensed.

11. An assembly according to claim 10 further comprising a closing member displaceable between an operative position in which said closing member closes said second open end of said brewing chamber and a rest position in which said closing member does not hinder access to said second open end of said brewing chamber, and second drive means coupled to said closing member for displacing said closing member between said operative and rest positions thereof.

12. A method of preparing coffee comprising the steps of:
   directing a selected amount of coffee powder into a brewing chamber in which the coffee powder is to be scalded;
   displacing a piston member axially toward the brewing chamber by actuating first drive means coupled to the piston member for axially displacing the piston member between a rest position in which the piston member is spaced from a first open end of the brewing chamber, to an operating position in which the piston member closes the first open end of the brewing chamber and reduces the internal volume of the brewing chamber containing the coffee powder to exert a preselected pressure on the coffee powder;
   sensing the pressure exerted by the piston member on the coffee powder in said brewing chamber and generating a stop signal when the preselected pressure is reached to stop the operation of the first drive means;
   directing a preselected amount of hot water into the brewing chamber; and
   dispensing the prepared coffee beverage through outlet means communicating with the brewing chamber.

13. A method according to claim 12 further comprising the steps of:
   retracting the piston member a preselected amount to relieve the pressure on the coffee powder in the brewing chamber; and
   subsequently moving a closing member by actuating second drive means coupled to the closing member for displacing the closing member between an operative position in which the closing member closes a second open end of the brewing chamber, and a rest position in which the closing member does not hinder access to the second open end of the brewing chamber, to its rest position to enable removal of the scalded coffee powder cake from the brewing chamber.

14. A method according to claim 13 further comprising the steps of:
   advancing the piston member into the brewing chamber to force the scalded coffee powder cake out of the brewing chamber; and
   subsequently moving the closing member to its operative position, the scalded coffee powder cake being completely removed from the brewing chamber by the movement of the closing member to its operative position.

* * * * *